F. H. WOOLF.
CANDY MACHINE.
APPLICATION FILED OCT. 28, 1911.

1,108,304.

Patented Aug. 25, 1914.
5 SHEETS—SHEET 1.

Witnesses:
C. E. Wesselo.
W. E. Smith.

Inventor:
Frank H. Woolf,
By Joshua R. H. Potts
His Attorney.

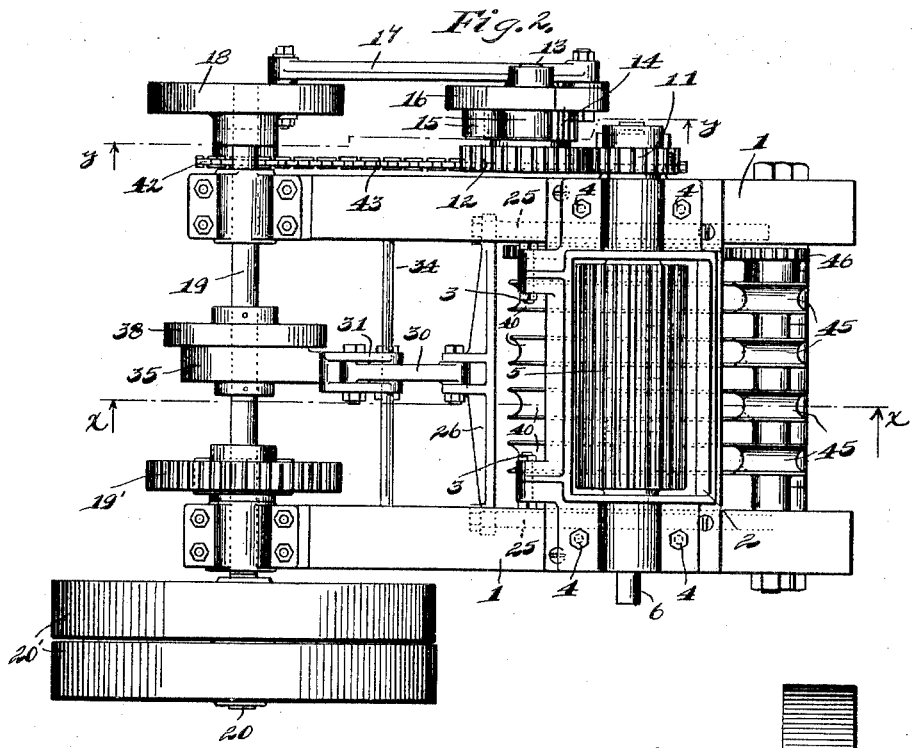

F. H. WOOLF.
CANDY MACHINE.
APPLICATION FILED OCT. 28, 1911.
1,108,304.
Patented Aug. 25, 1914.
5 SHEETS—SHEET 3.
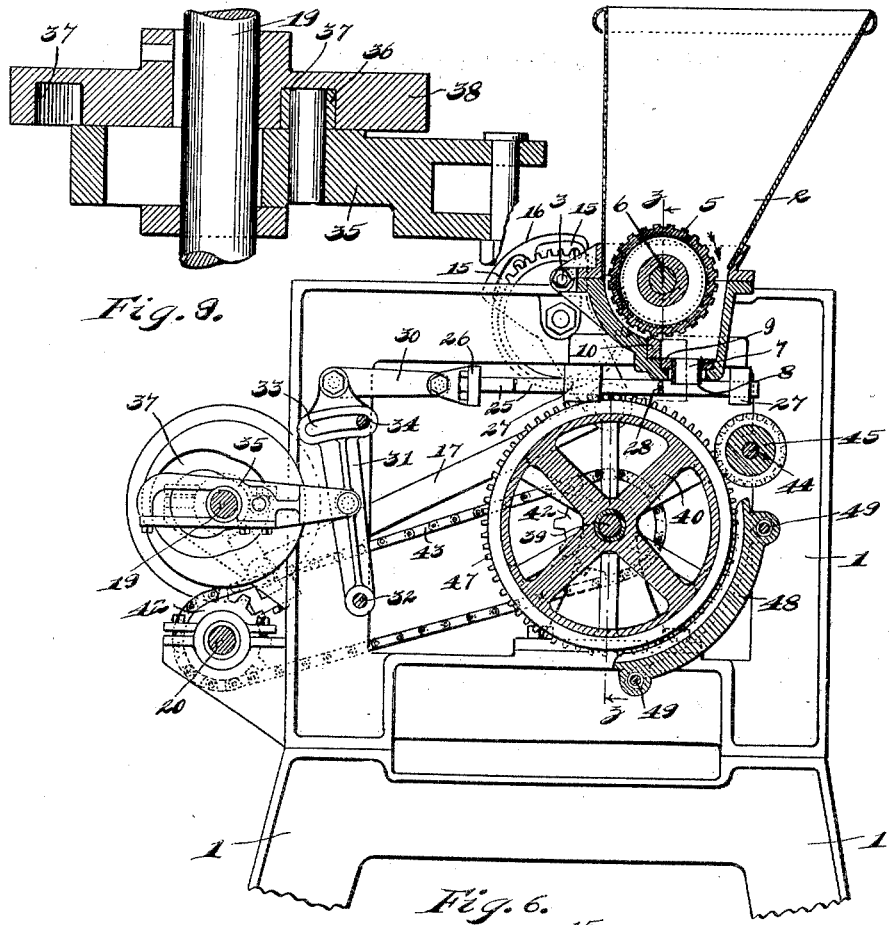
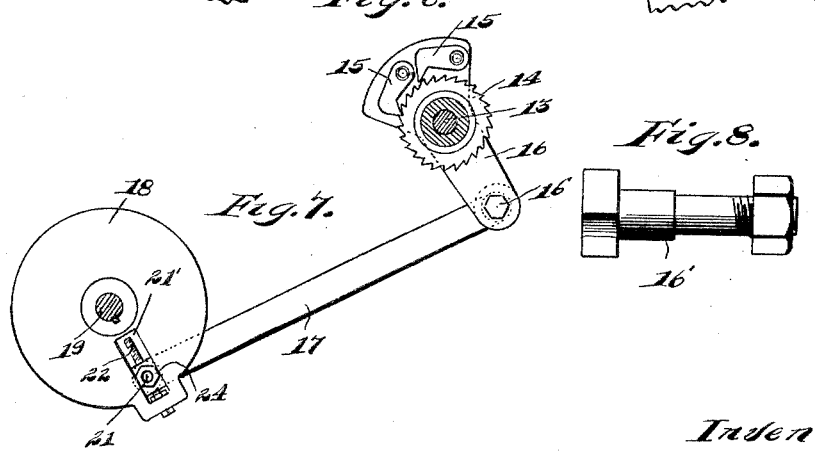
Witnesses:
C. E. Wessels.
W. T. Smith
Inventor:
Frank H. Woolf,
By Joshua R. H. Potts
his Attorney.

F. H. WOOLF.
CANDY MACHINE.
APPLICATION FILED OCT. 28, 1911.

1,108,304.

Patented Aug. 25, 1914.
5 SHEETS—SHEET 4.

Witnesses:
C. E. Wessels.
W. T. Smith.

Inventor:
Frank H. Woolf,
By Joshua R. H. Potts
his Attorney.

F. H. WOOLF.
CANDY MACHINE.
APPLICATION FILED OCT. 28, 1911.
1,108,304.
Patented Aug. 25, 1914.
5 SHEETS—SHEET 5.
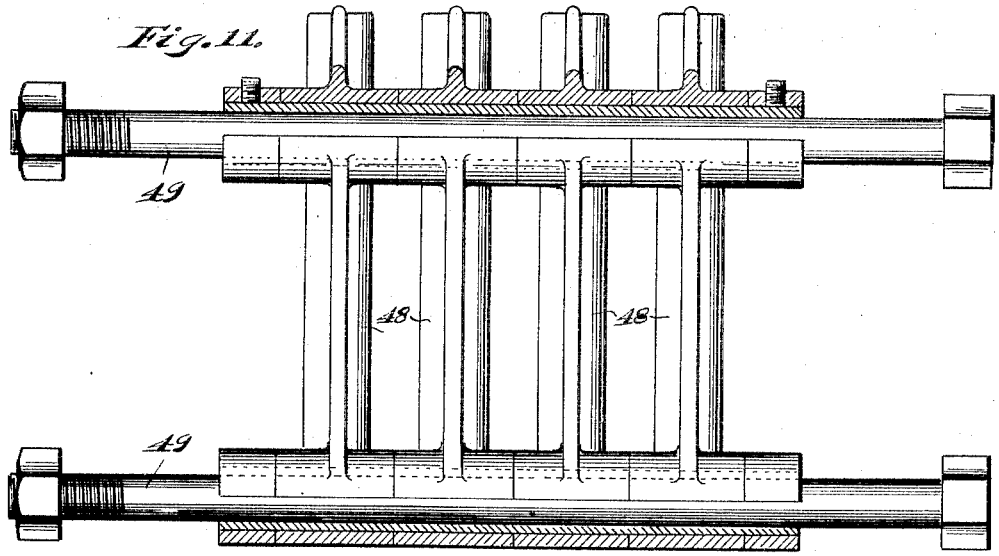
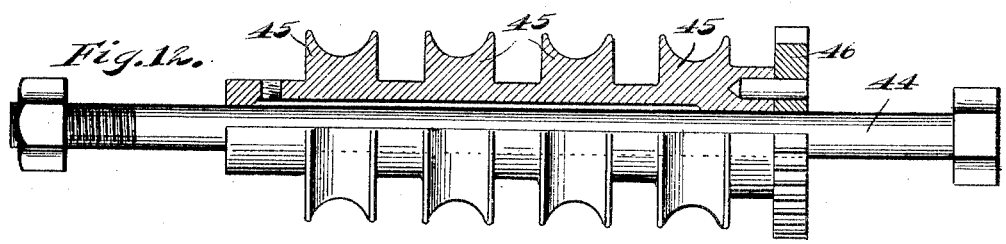
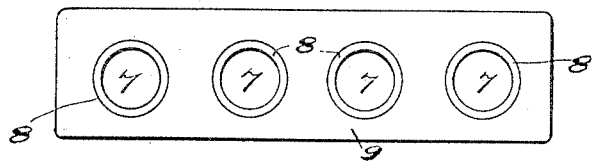
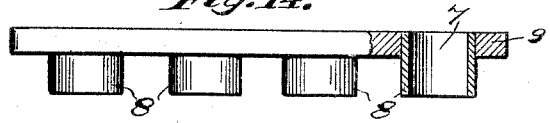
Witnesses:
C. E. Wessels.
W. C. Smith
Inventor:
Frank H. Woolf,
By Joshua R. H. Potts
his Attorney.

UNITED STATES PATENT OFFICE.

FRANK H. WOOLF, OF CHICAGO, ILLINOIS, ASSIGNOR OF ONE-HALF TO ISAAC E. BLOCK, OF CHICAGO, ILLINOIS.

CANDY-MACHINE.

1,108,304.   Specification of Letters Patent.   Patented Aug. 25, 1914.

Application filed October 28, 1911. Serial No. 657,333.

*To all whom it may concern:*

Be it known that I, FRANK H. WOOLF, a citizen of the United States, residing at 18 West Chicago avenue, Chicago, county of Cook, and State of Illinois, have invented certain new and useful Improvements in Candy-Machines, of which the following is a specification.

My invention relates to improvements in candy machines and more specifically to that class thereof adapted for use in the formation of candy balls.

The object of my invention is the production of a machine of the character mentioned which will be of durable and economical construction, one which will be of high efficiency in operation; and one through the medium of which candy balls in great numbers may be expeditiously formed.

Other objects will appear hereinafter.

With these objects in view, my invention consists in a candy machine characterized as above mentioned and in certain details of construction and arrangements of parts as will be hereinafter more fully described and particularly pointed out in the appended claim.

Figure 1:
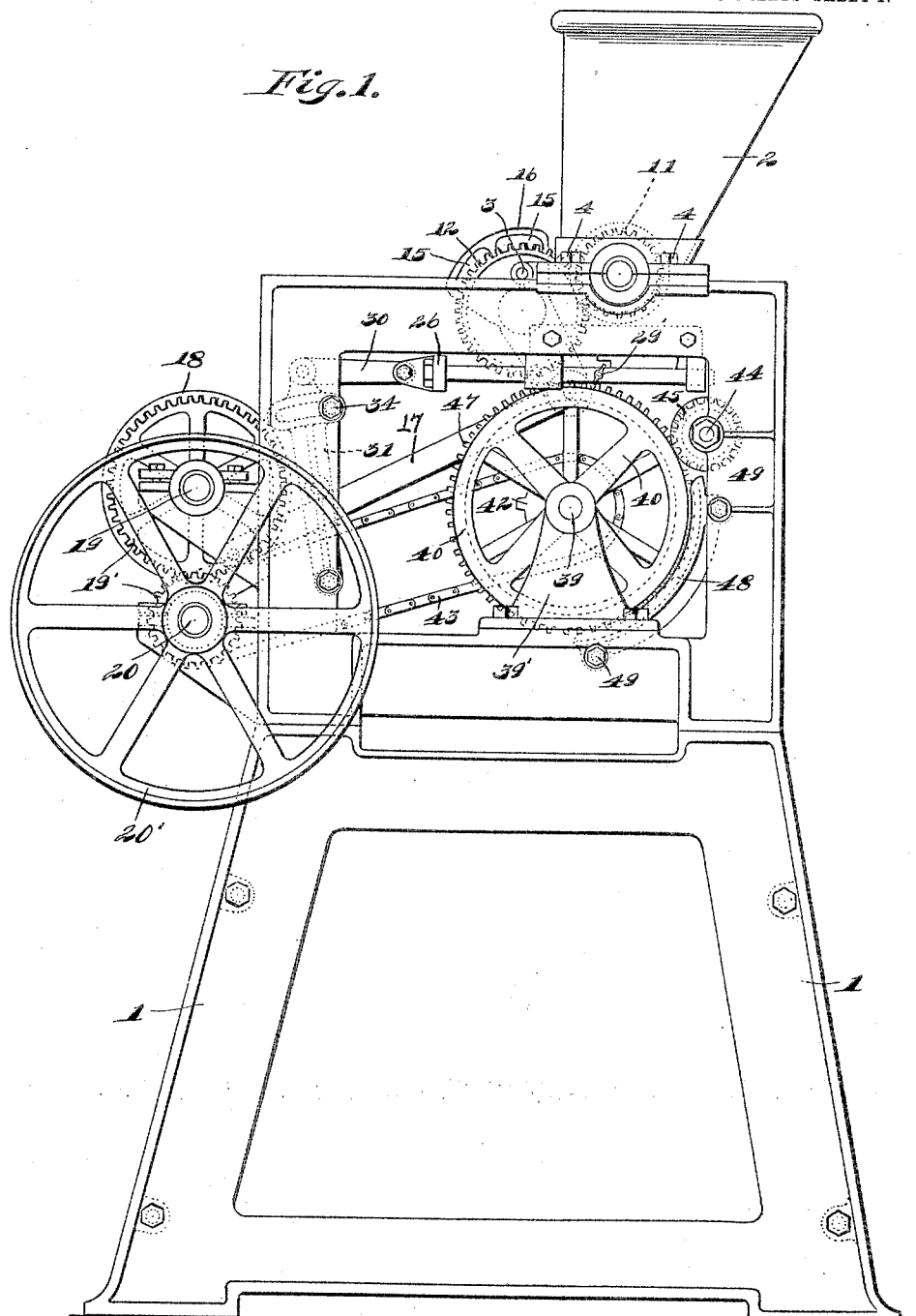
Figure 10:
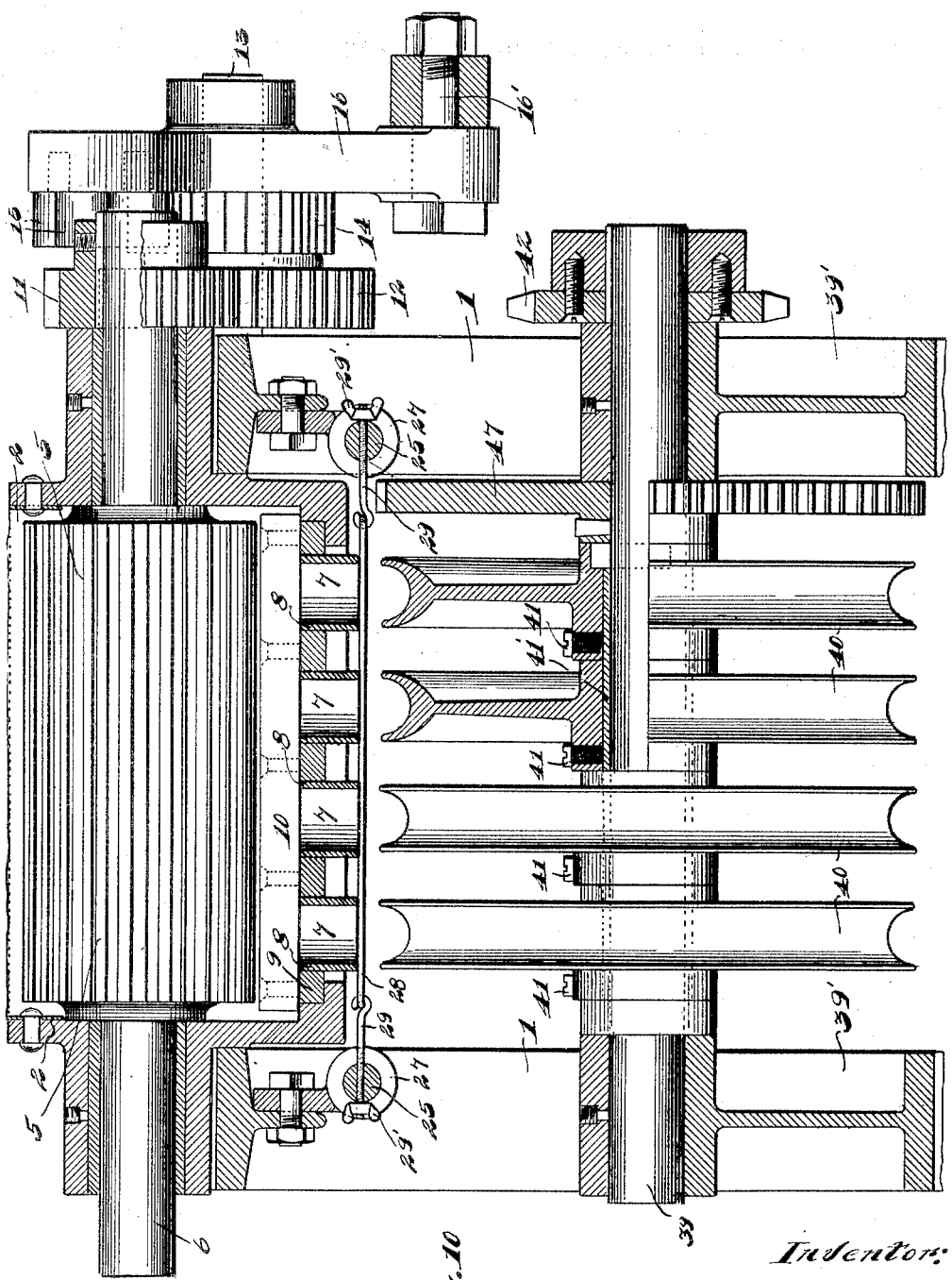

My invention will be best understood by reference to the accompanying drawings forming a part of this specification and in which, Figure 1 is a side elevation of a candy machine embodying my invention. Fig. 2 is a top plan view thereof, Fig. 3 is an enlarged sectional detail of a crank disk included in the construction showing the adjustable mounting of the wrist pin therein, Fig. 4 is a sectional side elevation of the wrist pin detached, Fig. 5 is a top plan view thereof, Fig. 6 is a vertical section of the device taken on substantially line *x—x* of Fig. 2, Fig. 7 is a section taken on substantially line *y—y* of Fig. 2, Fig. 8 is an enlarged detail of one of the pivot pins shown in the construction illustrated in Fig. 7, Fig. 9 is an enlarged sectional detail of a cam included in the construction and the adjacent parts of the construction coöperating therewith, Fig. 10 is an enlarged transverse section of the machine taken on substantially line *z—z* of Fig. 6, Fig. 11 is an enlarged sectional detail of the channel segments which are included in the machine, showing the same mounted upon their supporting rods, Fig. 12 is a similar view of channel rollers which form a part of the construction, Fig. 13 is a top plan view of the bottom plate of the hopper, and Fig. 14 is a partial sectional side elevation thereof.

The preferred form of construction as illustrated in the drawings comprises a supporting frame 1. Mounted at the upper end of the frame 1 is the hopper 2 which is pivotally secured at 3 so that when the locking bolts 4 are removed said hopper may be swung back so that ready access may be gained to the feeding roller 5 which is mounted in the hopper 2 at the lower end thereof. The roller 5 is fixed upon the shaft 6, the extremities of which are journaled in suitable bearings provided at the opposite sides of the frame 1, said roller being longitudinally corrugated so that when the same is rotated the corrugated surface will effectually grip the semi-fluid candy contained in the hopper for feeding the same downwardly toward the discharge openings 7 provided at the lower end of the hopper. The openings 7 are formed in the short tubes 8 which are spaced apart equally distant in a plate 9 which is removably arranged in the bottom of the hopper. By removably arranging the plate 9 in the hopper as stated it is evident that the same may be readily removed when desired for cleaning or to replace the same by a plate containing a greater or lesser number of discharge openings as desired. Also arranged within the hopper 2 below the feed roller 5 is a strip 10 extending parallel with said roller and in close proximity thereto, said strip being adapted to prevent the adherence of candy to the periphery of said roller, the same effecting the removal of the candy from the roller for discharge through the discharge openings 7.

The feeding roller 5 is intermittently rotated through the medium of meshing gears 11 and 12, the latter being carried by a stub shaft 13 which projects from one side of the frame 1. The intermittent rotation of the shaft 6 as mentioned is effected through the medium of a rachet wheel 14 which is carried by the shaft 13, pawls 15 which are carried by the rocker arm 16 mounted upon the shaft 13 being adapted to engage with said ratchet to intermittently rotate the same when said rocker arm is oscillated. It will be observed as shown in Fig. 7 that two pawls 15 are employed, said pawls being so arranged that when one is in operative position relative to the teeth of the ratchet 14 the other will be positioned midway two adjacent teeth, this arrangement being adopted to permit of a more minute adjustment of the length of the movement imparted to the ratchet wheel without necessitating an increase in the number of teeth in the periphery of the latter, it being clear that this arrangement in effect is tantamount to the employment of one pawl and double the number of teeth in the ratchet.

The lower end of the rocker arm 16 is pivotally connected by means of connecting rod 17 with a crank disk 18 carried by the shaft 19, the latter being operatively connected through meshing gears 19' with the driving shaft 20 which is provided with pulleys 20' to adapt the same to be driven through the employment of a belt, any suitable power being used in connection therewith. The connection of the arm 16 with the connecting rod 17 is made through the medium of the pin 16' which is shown in detail in Fig. 8, the wrist pin 21 which connects the opposite end of the rod 17 with the disk 18 being adjustably mounted in a radial slot 21' which is provided in said disk for effecting adjustment of the throw of the rod 17 when said disk is rotated. Longitudinal adjustment of the wrist pin 21 is effected through the medium of a screw 22 the inner end of which is in threaded connection with the central squared portion of said pin. The screw 22 is locked in positions of adjustment in the disk 18 through the medium of the lock nut 23, a lock nut 24 threaded upon one end of the pin 21 coöperating with the block 24' and the shoulders 24'' formed upon the pin 21 to lock the latter securely in positions of adjustment, it being clear that the extremities of the block 24' and the shoulders 24'' engage against the opposite sides of the disk 18 at the edges of the slot 21'. With this construction it will be observed that the adjustment of the throw of the rod 17 and hence the amplitude of rotary movement imparted to the feeding roller may be effected by simply rotating the screw 22, the outer end of the latter being provided with a head in order to facilitate such adjustment.

Arranged below the hopper 2 in close proximity to the lower ends of the discharge tubes 8 is a severing device comprising a U shaped frame which consists of the side bars 25 and the yoke 26 which connects the rearward ends of said bars 25. The latter are reciprocally mounted in perforated guide lugs 27 secured to the frame 1. In said frame is carried a wire member 28 extending transversely thereof between the bars 25, the opposite ends of said wire being adjustably connected with said bars through the medium of eye bolts 29, thumb nuts 29' threaded upon the outer ends of said eye bolts affording means for maintaining the wire member 28 stretched taut, it being clear that by turning said thumb nuts positively upon said bolts, said nuts engaging against the outer sides of the rods 25, the desired tightening of said wire member may be effected. The wire 28 as will be observed is so disposed that upon reciprocation of the frame in which the same is carried, said wire member will pass in close proximity to the lower extremities of the tubes 8 so as to be adapted to sever candy strips which may emerge from said tubes. Reciprocation of said frame is effected through the employment of a connecting rod 30 the outer end of which is in pivotal connection with the upper end of the rocker arm or lever 31. The lower end of said arm 31 is fulcrumed upon the transversely extending rod 32, the upper end of said arm being provided with an arcuate slot 33 for engagement with the transversely extending bar 34, the latter evidently serving as a means for maintaining the free end of said arm in the proper plane of oscillation during the operation thereof. The arm 31 is connected intermediate its extremities with the bar 35 the outer slotted end of which is slidably mounted upon the shaft 19. At the inner side of the bar 35 is mounted a roller 36 which engages a cam groove 37 provided in the cam 38 which is fixed to the shaft 19. The cam groove 37 is of such form that upon rotation of the cam 38 intermittent reciprocatory movement will be imparted to the member 35, the latter in turn effecting intermittent oscillatory movement of the arm 31 and which in turn through the medium of the member 30 imparts intermittent reciprocatory movement to the severing frame. In the operation of the device this intermittent reciprocatory movement imparted to the severing frame will effect the severing of the candy strips into pieces of equal length. The periods of operation of the severing mechanism will be timed to alternate with the periods of operation of the feeding roller 5 so that during the severing operation of the candy strips the feeding of the candy through the discharge openings will cease, thereby preventing jamming or congestion during the cutting operation.

Arranged below the severing mechanism is a transversely extending shaft 39 upon which is arranged a plurality of channel wheels 40. Said channel wheels are removably locked in position on said shaft by setscrews 41 threaded through the hubs of said wheels engaging a bushing 41' sweated upon said shaft. The shaft in turn is mounted in bearings 39' which are removably secured in the frame members 1 so that when desired the bearing brackets may be removed after which the shaft 39 may be readily de-mounted to permit of the removal of the channel wheels. Said channel wheels as will be observed by reference especially to Fig. 10 are disposed directly below or co-planer with the discharge opening 7, so that in the operation of the machine the candy pieces severed by the severing member 28 will drop into the channels in said channel wheels. Rotation of the shaft 39 is effected through the medium of sprocket wheels 42 and a sprocket chain 43 which passes thereover, one of said sprocket wheels being mounted upon the drive shaft 20 as clearly shown in Fig. 6. With this connection then during the operation of the machine the channel wheels 40 will be continuously rotated.

Arranged adjacent the channel wheels 40 and slightly above the shaft 39 is a transversely extending shaft 44 the respective extremities of which are secured rigidly in the opposite sides of the frame 1. Rotatably mounted upon the shaft 44 is a plurality of integrally formed channel rollers 45, see especially Fig. 12, said rollers being so positioned that the peripheries thereof register with the peripheries of the channel wheels 40, as clearly shown in Figs. 2 and 6. Said channel rollers 45 are operatively connected through the medium of a pinion 46 which is pinned thereto and the gear 47 which meshes with said pinion with the shaft 39, the gear 47 being fixed to the latter. With this construction then it will be seen that the channel wheels 40 and the channel rollers 45 will be simultaneously rotated in opposite directions, the candy pieces deposited in the peripheries of said channel wheels as above mentioned being carried thereon for passage between the same and the channel peripheries of said rollers. Arranged below the rollers 45 is a plurality of channel segments 48 the respective extremities of which are secured upon transversely extending bars 49 mounted at their extremities in the opposite sides of the frame 1. The segmental members 48 are disposed in close proximity with the peripheries of the channel wheels 40, the curvature of said members 48 corresponding with that of the peripheries of said wheels.

The arrangement is such as will be observed that during the operation of the device after the passage of the candy pieces between the wheels 40 and the rollers 45 the same will be carried by said wheels for engagement with said segment members 48. The rollers 45 in this operation serve primarily to feed the candy pieces toward the members 48, the latter through the coöperation of the channel wheels therewith effecting the formation of the candy pieces into balls or spheres in the passage thereof through said members; the balls or spherical candy pieces discharged at the lower ends of the segmental members being accommodated in pans or other receptacles provided for the reception thereof below the lower terminals of said segmental members.

A candy machine of the construction set forth is of durable construction and of high efficiency in operation. The channel wheels 40, channel rollers 45 and the channel segments 48 are so mounted that the same may be readily removed if desired and others of a desirable size arranged in their places. The bottom plate 9 of the hopper 2 is also as above stated, removably arranged in position so that in the alteration in size or position of said channel wheels, rollers and segments, said bottom plate may also be changed to correspond. The parts of the machine are so mounted and disposed that ready access thereto is afforded and whereby breakage may be readily repaired and also whereby the mechanism may be readily maintained in a sanitary condition.

While I have illustrated and described the preferred form of construction for carrying my invention into effect, this is capable of variation or modification without departing from the spirit of the invention. I therefore do not wish to be limited to the exact details of construction set forth but desire to avail myself of such variations and modifications as come within the scope of the appended claim.

Having described my invention what I claim as new and desire to secure by Letters Patent is:

A machine of the kind described comprising a frame; a candy lump cutting means in said frame; a shaft rotatively mounted in said frame; a sleeve secured on said shaft; a plurality of grooved candy forming wheels secured independently on said sleeve; a second set of grooved candy forming wheels formed integrally and journaled in said frame, said first set and second set of grooved wheels coacting to catch material dropped from said candy lump cutting means and disposed lower than the latter in said frame; and a grooved candy forming sector secured concentric with each of said first set of grooved wheels and disposed under said second set of grooved wheels, substantially as described.

In testimony whereof I have signed my name to this specification in the presence of two subscribing witnesses.

FRANK H. WOOLF.

Witnesses:
 ARTHUR A. OLSON,
 JOSHUA R. H. POTTS.